United States Patent Office 2,944,050
Patented July 5, 1960

---

2,944,050
WATER-INSOLUBLE AZO DYESTUFFS

Heinz Haubrich and Reinhold Hörnle, Koln-Stammheim, and Hans Raab, Leverkusen, Germany, assignors to Farbenfabriken Bayer Aktiengesellschaft, Leverkusen, Germany, a corporation of Germany No Drawing. Filed May 20, 1958, Ser. No. 736,463
Claims priority, application Germany June 7, 1957

3 Claims. (Cl. 260—178)

The present invention relates to water-insoluble azo dyestuffs and to a process for their manufacture; more particularly it relates to polyazo dyestuffs corresponding to the formula

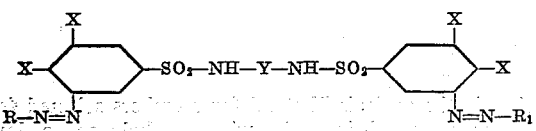

wherein the radicals X denote hydrogen, halogen, alkoxy, alkyl or nitro, Y stands for an aromatic or saturated aliphatic radical and R and $R_1$ mean radicals of azo components which are free of sulfonic acid and carboxylic acid groups.

The new azo dyestuffs are obtainable by coupling tetrazotized diamines of the following formula

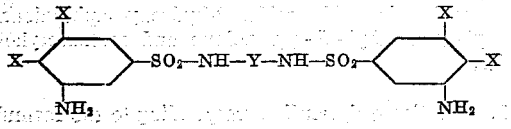

wherein X and Y have the above mentioned meaning, with azo components free of sulfonic acid or carboxylic acid groups.

Suitable tetrazo components for the manufacture of the new dyestuffs are for example:

1,2-di-(3'-amino-4'-methoxybenzene-sulfonylamino)-ethane,
1,4-di-(3'-amino-4'-methoxybenzene-sulfonlyamino)-benzene,
1,2-di-(3'-amino-4'-methylbenzene-sulfonylamino)-ethane,
1,4-di-(3'-amino-4'-methoxybenzene-sulfonylamino)-butane,
1,6-di-(3'-amino-4'-methoxybenzene-sulfonlyamino)-hexane.

The tetrazo components to be used according to the invention are obtainable by usual methods, for example, by reacting 2-acetylamino-1-methylbenzene-4-sulfonic acid chloride with aliphatic diamines in an aqueous soda-alkaline medium and then saponifying the products thus formed. It is also possible to condense 3-nitro-4-methoxybenzene-sulfonic acid chloride, for example, with aromatic or saturated aliphatic diamines and to reduce subsequently the nitro groups in usual manner.

Acid chlorides suitable for the reaction with diamines are for example 4-methoxy-3-acetylamino-benzene-sulfonic acid chloride, 3-nitro-benzene-sulfonic acid chloride, 4-chloro-3-nitro-benzene-sulfonic acid chloride or 3-nitro-4-methyl-benzene-sulfonic acid chloride.

As diamines there may be mentioned for example:

1,2-ethylene-diamine, 1,4-diaminobutane, 1,6-diaminohexane, 1,4-diaminobenzene or 1,3-diamonobenzene.

As azo components there may be used the usual compounds, which are capable of coupling and free from sulfonic acid or carboxylic acid groups, such as the arylides of 2-hydroxy-naphthalene-3-carboxylic acid, hydroxybenzenes, hydroxy-naphthalenes, acetic acid arylides or heterocyclic compounds capable of coupling.

The manufacture of the new dyestuffs is carried out according to usual methods by reacting the tetrazotized diamine, depending on the type of the coupling components which are preferably the same, in an aqueous or organic alkaline to acid medium. The pigment dyestuffs thus obtained are particularly suitable for the dyeing of nitro- or synthetic resin lacquers as well as for the dyeing of plastics, printing and dyeing of textiles by the usual pigment printing or dyeing methods and for spin-dyeing of the fibres. The pigments possess an excellent fastness to solvents and, when incorporated with nitro or synthetic resin lacquers, exhibit a very good fastness to overspraying.

The following examples are given for the purpose of illustrating the invention without, however, limiting it thereto; the parts by volume and the parts by weight standing in ratio of grams to millilitres.

Example 1

43.0 parts by weight of 1,2-di-(3'-amino-4'-methoxybenzene-sulfonylamino)-ethane are dissolved with 1000 parts by volume of water and 55 parts by volume of hydrochloric acid (19.5° Be.) and terazotized at 0–5° C. with 46 parts by volume of a 30 percent sodium nitrite solution. 42 parts by volume of glacial acetic acid are added to the clear tetrazo solution and then an aqueous solution of the sodium salt of 72 parts by weight of 1-2',3'-hydroxy-naphthoylamino)-4-chloro-2.5-dimethoxybenzene. The dyestuff precipitates as dark red crystals and is filtered off with suction, washed and dried at 50° C.

3 parts by weight of the pigment thus obtained are pasted in a funnel mill with 100 parts by weight of a nitroalkyd resin lacquer (having 22 percent of solids). This lacquer, when adjusted to spraying viscosity, yields carmine red lacquerings having a satisfactory gloss and a very good fastness to overspraying.

Example 2

47.8 parts by weight of 1,4-di-(3'-amino-4'-methoxybenzene-sulfonylamino)-benzene are tetrazotized according to the method of Example 1. The clear tetrazo solution is treated with 42 parts by volume of glacial acetic acid and then with an aqueous solution of the sodium salt of 72 parts by weight of 1-(2,3'-hydroxy-naththoylamino)-4-chloro-2,5-dimethoxybenzene. The dyestuff thus obtained is filtered off with suction, washed and dried at 50° C. After working into a synthetic resin lacquer, a bordeaux of very good fastness to solvents is obtained.

Example 3

39.8 parts by weight of 1,2-di-(3'-amino-4'-methylbenzene-sulfonylamino)-ethane are tetrazotized according to the instruction of Example 1. An aqueous solution of the sodium salt of 53 parts by weight of 1-(2',3'-hydroxynaphthoylamino)-benzene is run into the solution treated with 42 parts by volume of glacial acetic acid. After filtering off with suction, washing and drying, a dyestuff powder is obtained which on working into a lacquer, yields a clear scarlet of very good fastness to overspraying.

In a similar manner to that there are obtained with the tetrazo and azo components listed in the following table pigment dyestuffs which dye nitro and synthetic resin lacquers in the following shades fast to solvents and over-spraying.

| Tetrazo component | Azo component | Shade |
|---|---|---|
| 1,2 - Di (3'-amino-4'-methoxybenzene-sulfonylamino)-ethane. | 2-Hydroxynaphthalene. | Orange-red. |
| Do. | 1 - (aceto - acetylamino)-2,4-dimethylbenzene. | yellow. |
| Do. | 1 - (2',3' - Hydroxynaphthoyl - amino) - 4 - chlorobenzene. | scarlet. |
| Do. | 1 - (2',3' - Hydroxynaphthoylamino) - 2,5 - dimethoxybenzene. | carmine. |
| 1,4 - Di - (3' - amino - 4'-methoxybenzene-sulfonylamino)-butane. | 1 - (2',3' - Hydroxynaphthoylamino) - 4 - chloro - 2,5 - dimethoxybenzene. | bordeaux. |
| 1,6 - Di - (3' - amino - 4'-methoxybenzene-sulfonylamino)-hexane. | 1 - (2',3' - Hydroxynaphthoylamino) - 4 - methoxybenzene. | scarlet. |
| 1,2 - Di - (3' - amino - 4'-methylbenzene - sulfonylamino)-ethane. | 1 - (2',3' - Hydroxynaphthoylamino) - 2 - methylbenzene. | Do. |
| Do. | 1 - (2',3' - Hydroxynaphthoylamino) - 2,5 - dimethoxybenzene. | bordeaux. |
| 1,2 - Di - (3' - amino - 4'-methoxybenzene - sulfonylamino)-ethane. | 1 - Phenyl - 3 - methylpyrazolone-(5). | yellow. |
| Do. | 1 - (2',5' - dichlorophenyl)-3 - methylpyrazolone - (5). | Do. |
| Do. | 1 - (2',3' - Hydroxynaphthoylamino) - 4 - methoxybenzene. | red. |
| Do. | 1 - (2',3' - Hydroxynaphthoylamino) - 4 - ethoxybenzene. | Do. |
| Do. | 1 - (2',3' - Hydroxynaphthoylamino) - naphthalene. | Do. |
| 1,2 - Di - (3' - aminobenzene-sulfonylamino)-ethane. | 1 - (2',3' - Hydroxynaphthoylamino) - 4 - chloro-2 - methylbenzene. | Do. |
| Do. | 1 - (2',3' - Hydroxynaphthoylamino) - 4 - chloro-2,5-dimethoxybenzene. | bordeaux. |
| Do. | 1 - (2',3' - Hydroxynaphthoylamino) - 4 - ethoxybenzene. | red. |
| 1,2 - Di - (3' - amino - 4'-chlorobenzene - sulfonylamino)-ethane. | do. | orange-red. |

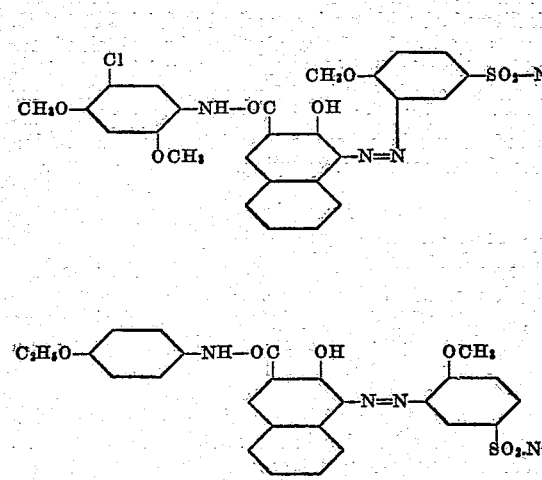

| Tetrazo component | Azo component | Shade |
|---|---|---|
| 1,2 - Di - (3' - amino - 4' - chlorobenzene - sulfonylamino)-ethane. | 1 - (2',3' - Hydroxynaphthoylamino) - 4 - chloro-2,5 - dimethoxybenzene. | bordeaux. |
| Do. | 1 - (Aceto - acetylamino)-2-methoxybenzene. | yellow. |
| 1,2 - Di - (3' - amino - 4'-methoxybenzene - sulfonylamino)-ethane. | 1 - (2',3' - Hydroxynaphthoylamino) - 5 - chloro - 2,4 - dimethoxybenzene. | carmine-red. |
| 1,4 - Di - (3' - amino -4' - methoxybenzene - sulfonylamino)-benzene. | do. | bordeaux. |
| 1,4 - Di - (3' - amino - 4'-methoxybenzene - sulfonylamino)-butane. | do. | Do. |
| 1,2 - Di - (3' - aminobenzene-sulfonylamino)-ethane. | do. | Do. |
| 1,2 - Di - (3' - amino - 4' - chlorobenzene - sulfonylamino)-ethane. | do. | Do. |

Example 4

The dyestuff from tetrazotized 1,2-di-(3'-amino-4'-methoxybenzene-sulfonylamino)-ethane and 1-(2',3'-hydroxynaphthoylamino)-4-chlorobenzene is brought by known methods such as indicated, for example, in German patent specification No. 949,284, into a form suitable for the spin-dyeing of viscose fibres and added to a standard spinning solution of cellulose-xanthogenate in a ratio of 2 parts by weight of finely divided dyestuff per 100 parts by weight of pure cellulose. The solution is then spun in usual manner. Fibres of a clear red shade are thus obtained which distinguish themselves by a very good fastness to textile detergents such as trichloroethylene or benzine.

We claim:

1. Water-insoluble disazo dyestuffs of the following composition:

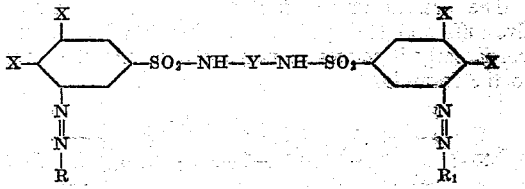

wherein the radicals X stand for members selected from the group consisting of hydrogen, halogen, a lower alkoxy, lower alkyl and nitro group, Y means a member selected from the group consisting of a radical of the benzene series and a saturated aliphatic radical having 1 to 6 carbon atoms, and R and $R_1$ stand for radicals of an azo coupling component being free of sulfonic acid and carboxylic acid groups, said azo coupling component being selected from the groups consisting of the 2,3-hydroxynaphthoic acid amide, 2-hydroxy-naphthalene, 1-phenyl - 3 - methyl - 5 - pyrazolone and acetoacetylamino series.

2. The disazo dyestuff corresponding to the formula

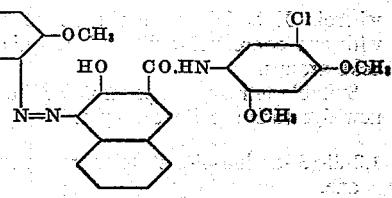

3. The disazo dyestuff corresponding to the formula

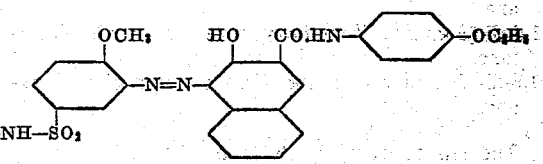

References Cited in the file of this patent

UNITED STATES PATENTS 2,164,785 Rossander _____ July 4, 1939
2,780,618 Ackermann et al. _____ Feb. 5, 1957

OTHER REFERENCES

Lubs: "Chemistry of Synthetic Dyes and Pigments," 1955, pages 182–192.